United States Patent [19]

Sher

[11] Patent Number: 5,039,044
[45] Date of Patent: Aug. 13, 1991

[54] VERTICALLY ADJUSTABLE HOLDER

[76] Inventor: Joseph M. Sher, 6161 NW. 57th Ct., Apt. 309, Tamarac, Fla. 33319

[21] Appl. No.: 260,244

[22] Filed: Oct. 20, 1988

[51] Int. Cl.⁵ ............................................ F16M 11/00
[52] U.S. Cl. ...................................... 248/176; 108/96; 211/59.4; 248/918
[58] Field of Search ............... 248/176, 1 B, 551, 552, 248/553, 917, 444.1, 918; 211/59.4, 43; 108/96, 98

[56] References Cited

U.S. PATENT DOCUMENTS

| | | |
|---|---|---|
| 848,991 | 4/1907 | Harvey . |
| 1,276,501 | 8/1918 | Douglas .......................... 248/297.5 |
| 1,788,096 | 1/1931 | Friedemann ......................... 108/96 |
| 2,134,606 | 10/1938 | Hackworth ....................... 211/43 X |
| 2,620,929 | 12/1952 | Sportsman ....................... 211/43 X |
| 3,104,138 | 9/1963 | Renaud ............................. 312/195 |
| 3,510,131 | 5/1970 | Gardner ............................. 272/78 |
| 3,658,285 | 4/1972 | Cohen ............................... 248/163 |
| 3,854,783 | 12/1974 | Teranishi .......................... 312/108 |
| 4,105,176 | 8/1978 | Hill et al. .......................... 248/13 |
| 4,162,013 | 7/1979 | Tucker ............................... 211/43 |
| 4,193,351 | 3/1980 | Belokin, Jr. ................... 211/59.4 X |
| 4,313,589 | 2/1982 | Vega ............................... 248/444.1 |
| 4,508,302 | 4/1985 | Hausser .......................... 248/297.3 |
| 4,579,311 | 4/1986 | Spranza, III ...................... 248/553 |
| 4,632,344 | 12/1986 | Lang et al. ........................ 248/165 |
| 4,727,992 | 3/1988 | Sharp ........................... 248/551 X |

FOREIGN PATENT DOCUMENTS 199877 7/1923 United Kingdom .................. 108/96

Primary Examiner—David L. Talbott

[57] ABSTRACT

A vertically adjustable holder for securing above a television set at least one article, such as a video cassette recorder (VCR), or for securing above a video monitor at least one article, such as a printer. It is of knockdown construction for economy of storage and transport. The holder includes: a flat base that fits underneath the television set or video monitor; vertical legs attached in the rear of the base that extend upward to above the television set or video monitor; and a horizontal platform located above the television set or video monitor, upon which at least one article is held. The platform has apertures at the rear that slidably engage the vertical legs when at certain angles, and fixedly engage the legs at other angles. The platform is slidably adjusted on the legs until it is close to, or resting upon the television set or video monitor. An optional accessory shelf, which also has apertures at its rear that slidably engage the vertical legs, may be mounted above the article(s) on the horizontal platform. In order to provide ventilating space to an article below the accessory shelf, (such as a VCR or other heat generating objects), the accessory shelf has spacing legs.

2 Claims, 3 Drawing Sheets

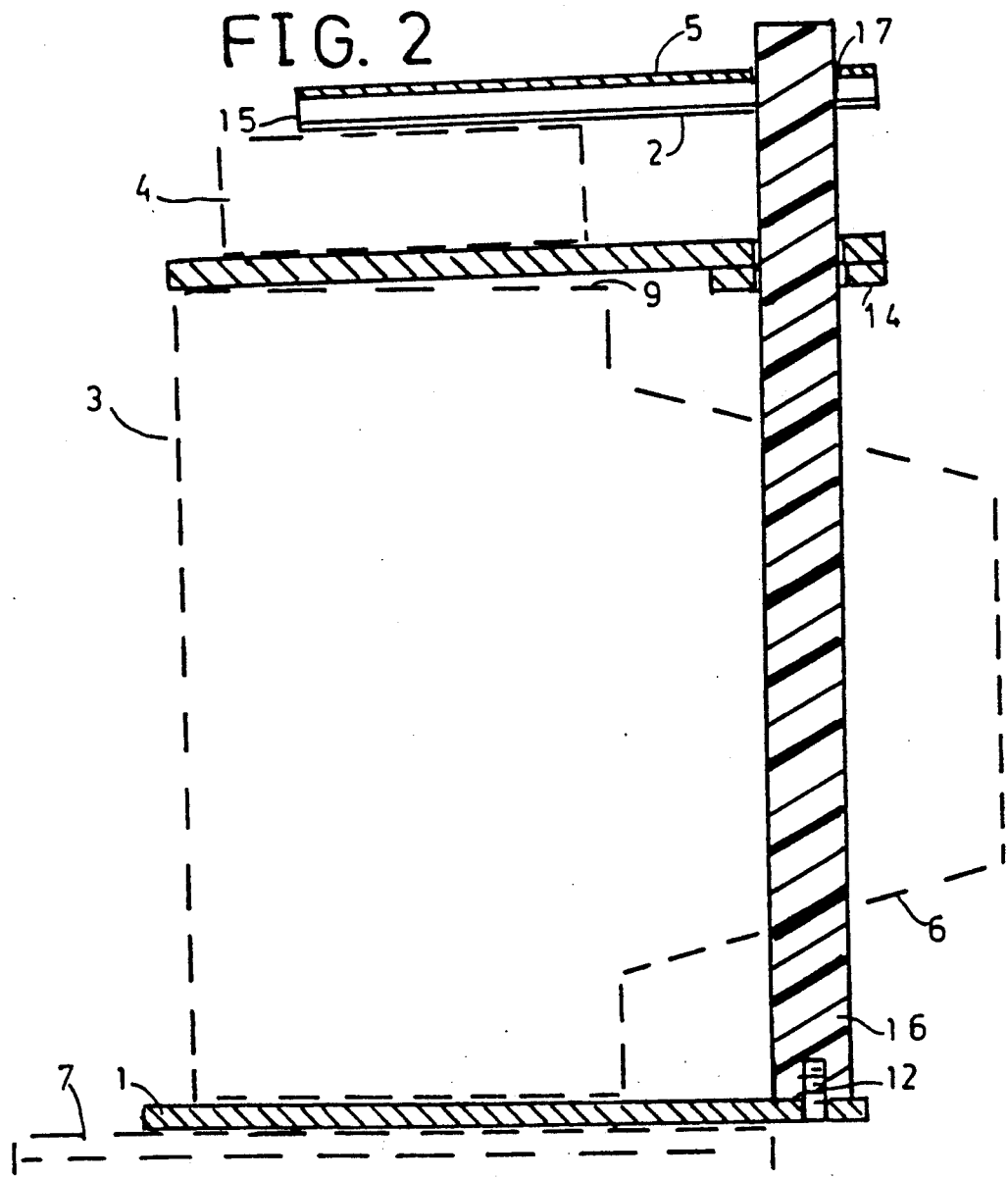

VERTICALLY ADJUSTABLE HOLDER

BACKGROUND OF THE INVENTION

This invention relates to support stands and more particularly to a knockdown, vertically adjustable support for holding one or more articles such as a video cassette recorder (VCR) or video cassette player above a television set. In addition, the invention can also be utilized for holding objects such as a computer printer, computer diskettes, or user manuals, above a video monitor when employed with a microcomputer or computer terminal.

A VCR has become a popular accessory for use with a television set. The location most suitable for its operation is often above the television set for a variety of reasons: By being situated above the set, the VCR may be handled without bending. Adequate height may allow easier operation of the infrared remote control by avoiding obstructions that are often present when the VCR is too close to the floor. In addition, the space above the television is often not utilized. By placing the VCR there, space elsewhere can be used for other purposes.

In many cases, the VCR is too large to rest securely on the rather narrow flat portion of the top of the television set. When placed there, the VCR may protrude over the front and/or rear of the television set. These protrusions may be considered cosmetically unappealing. In some situations, the narrow television top may not even be secure enough to handle the force of pushing a cassette into a VCR. Generally, vendors of VCR's and furniture retailers sell cabinets or "entertainment centers" with a plurality of shelves that avoid these problems. However, they are typically expensive, bulky, and sometimes impair ventilation of the equipment. The tops of many computer video monitors also have a limited amount of flat horizontal surface area. A large sturdy surface above a video monitor could accomodate articles such as a printer, computer diskettes, or user manuals.

SUMMARY OF THE INVENTION

It is accordingly an object of the invention to provide a sturdy and sufficiently large surface for holding articles above a video screen component (such as a television set or video monitor), whereby the invention will be inexpensive, knock down to a small package for transport and storage, be easy to assemble and use, adjust to fit a particular video screen component, and will ensure adequate ventilation of the electronic equipment. Possible articles to be held above a television set include a video cassette electronic instrument (such as a video cassette recorder, player, or rewinder), as well as a video cassette storage cabinet, or audio components (stereo receiver, speakers, etc.). Possible articles to be held above a video monitor include a computer printer, diskettes, user guides, and a variety of other computer accessory items.

When used in conjuntion with a television set, the invention includes a base means that is sandwiched by a sturdy support surface below it and a television set above it to securely anchor the assembly; at least one vertical member means attached to the rear portion of the base means and extending upwards therefrom; and a horizontal platform vertically adjustable on, and supported by said vertical member means, said horizontal platform of a size sufficient to hold a VCR or other article(s) of interest, and said horizontal platform extending forward from said vertical member means.

When in place, the base means rests upon a stable support surface (such as a table top, chest of drawers top, television stand, or other suitable surface), the television set rests upon the base means, the vertical member means extend upward behind the television set, and the horizontal platform extends forward from the vertical member means over the top of the television set. The platform may be vertically adjusted until it rests upon the top of the television set for most stable operation. A secondary platform may be optionally provided to be positioned above the VCR (or other article(s) held by the primary platform), said secondary platform also supported by, and vertically adjustable on the vertical member means for holding one or more objects such as a cable control, cassette storage and the like. The secondary platform may have spacing legs to allow ventilation of the article(s) placed below it on the primary platform.

As stated above, the invention may also be utilized with a video monitor in conjunction with a microcomputer or computer terminal. Often a computer video monitor rests upon the upper surface of a metal or plastic computer case that houses the microprocessor and disk drives. This housing rests upon a sturdy surface such as a table. The base of the invention may either be sandwiched between the table and the housing, or between the top of the housing and the video monitor. The holder's platform is placed above the top of the video monitor. The platform may require spacing legs to allow ventilation of the monitor.

The objects, advantages, and features of the invention will become more fully apparent when the following detailed description of preferred embodiments of the invention are read in conjunction with the accompanying drawings.

BRIEF DESCRIPTION OF THE DRAWINGS

FIG. 2 is a cross sectional view through 2—2 of FIG. 1.

FIG. 3 is a cross sectional view as in FIG. 2 of an embodiment with molded base and molded horizontal platform.

DETAILED DESCRIPTION OF PREFERRED EMBODIMENTS

Figure 1:
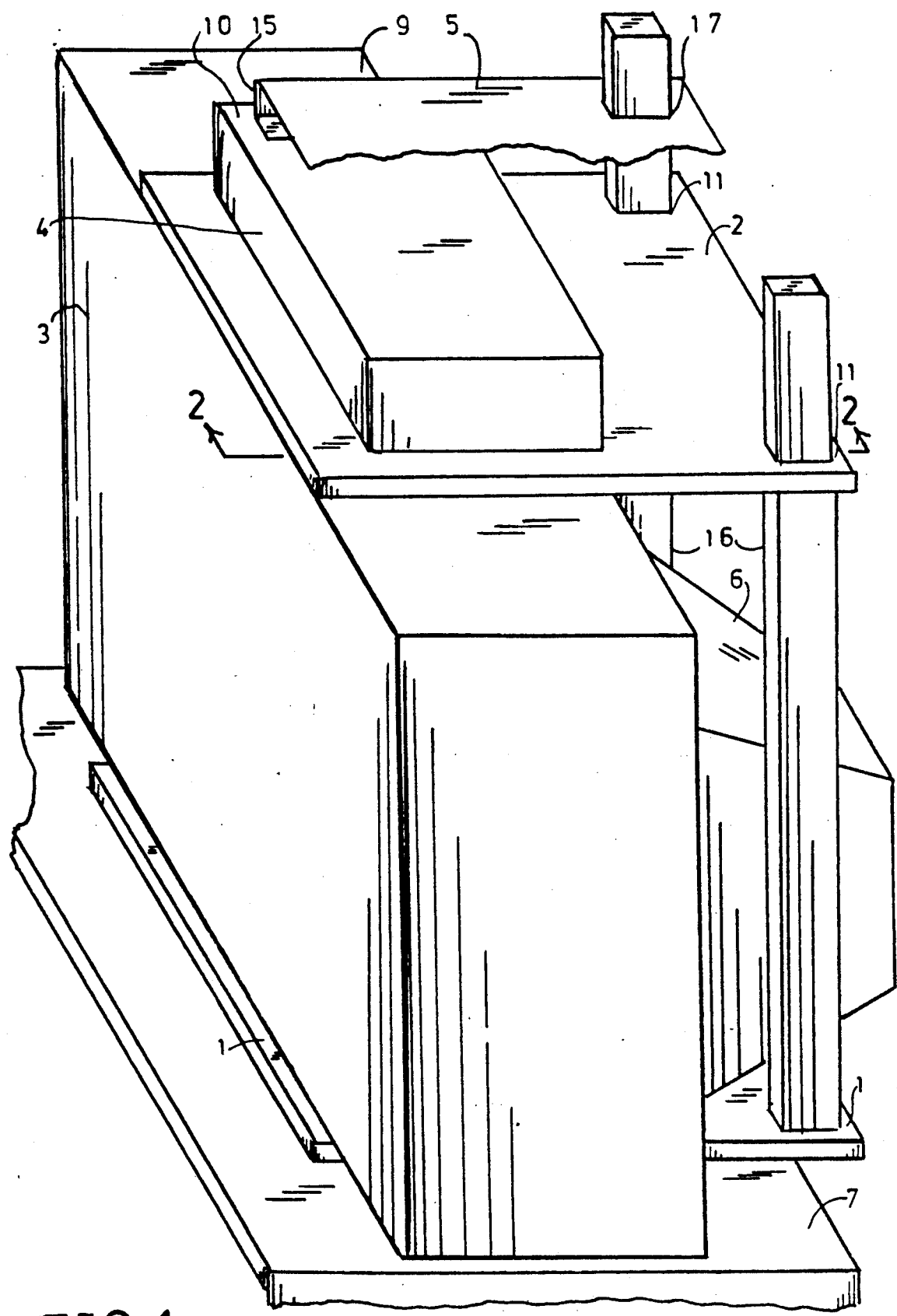
FIG. 1 is a perspective view of the invention in use.

Referring now first to FIGS. 1 and FIGS. 2 showing the holder in use with the VCR 4, television set 3 and table 7 (shown in phantom in FIG. 2), the holder comprises a base 1 that rests upon a table or other suitable surface. The television set 3 rests upon the flat, planar base 1, thereby securely fixing the base and the holder in place due to the weight of the television set.

A pair of vertical members 16 are attached to the base 1 by bolts 12 (FIG. 2). The vertical members are attached near the rear corners of the base so that they are behind the widest dimension of the television set and straddle the central protuberence 6 that extends behind the television set and contains the gun of the picture tube. As such, the vertical members are hardly noticeable when viewing from the front of the television.

The horizontal platform 2 has two rectangular apertures 11 closely fitting the rectangular cross section of the vertical members 16 near its rear corners The holder is preferably transported in knock-down or disassembled form. The vertical members are bolted to the base 1 by bolts 12 (FIG. 2), or other fastening means well known in the art of knockdown furniture. The base 1 is positioned on the table 7 and the television set 3 is placed on the base as shown. The horizontal platform 2 is mounted on the vertical members 16 by fitting them through the rectangular apertures 11 at the rear of platform 2. The platform 2 is forced down on the vertical members until the bottom of platform 2 is at, or close to, the upper surface 9 of television set 3. The VCR 4 is then placed upon the upper surface of platform 2 which may be provided with a frictional surface to prevent sliding. As shown in the view of FIG. 2, the platform 2 was positioned slightly above the television set and its weight together with the weight of the VCR has tilted the platform slightly downward until it rests against the anterior portion of the television set 3. Alternatively, the platform may be positioned lower on the vertical members 16 so that it tilts slightly rearward. In both cases, the edges of the apertures in platform 2 firmly engage the vertical members 16 so that there is no need for clamps to hold the platform at a fixed height. In order to raise or lower the platform 2 freely on the vertical members 16, the platform must be close to a right angle to the vertical members. Alternatively, the apertures in the horizontal platform and/or the vertical members may be configured at an angle from the vertical so that the horizontal platform grips the the vertical members when there is no downward or upward slope of the platform, and allows movement at some angles other than ninety degrees. By locating the vertical member engaging apertures so far to the rear, the cantilever action makes assembly and use very simple. An optional bar 14 (FIG. 2) may be provided for extra support at the apertures.

Figure 4:
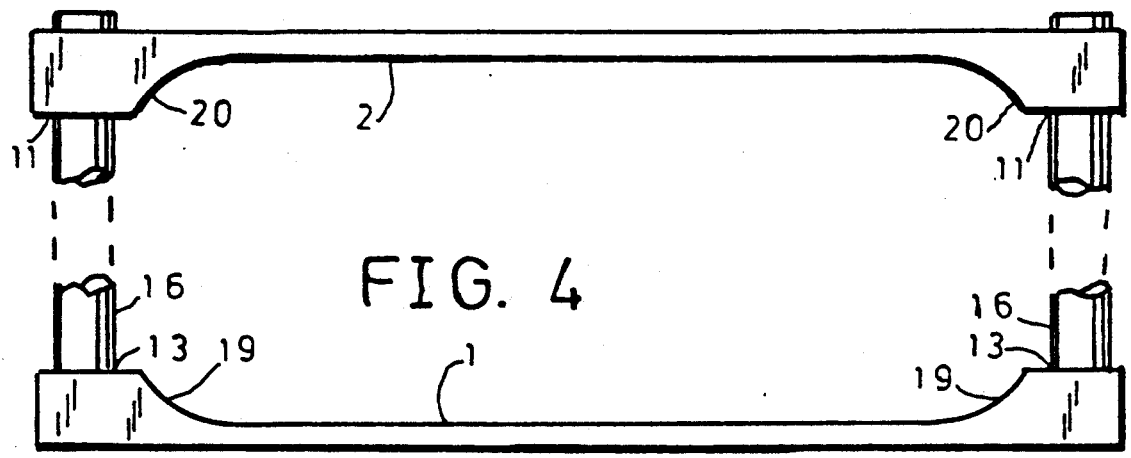
FIG. 4 is a rear elevation view of the holder of FIG. 3.

The vertical members 16 may be of rectangular cross section in a solid or hollow transparent plastic, or wood, or metal as desired. As shown in FIGS. 3 and 4, the vertical members 16 may be round and the base 1 may be cast o molded with enlarged portions 19 having apertures 13 into which vertical members 16 fit snugly. The horizontal platform 2 also is cast or molded with enlarged portions 20 having apertures 11 through which pass the vertical members 16. These may be cast or molded of metal or plastic o shaped in wood.

Figure 5:
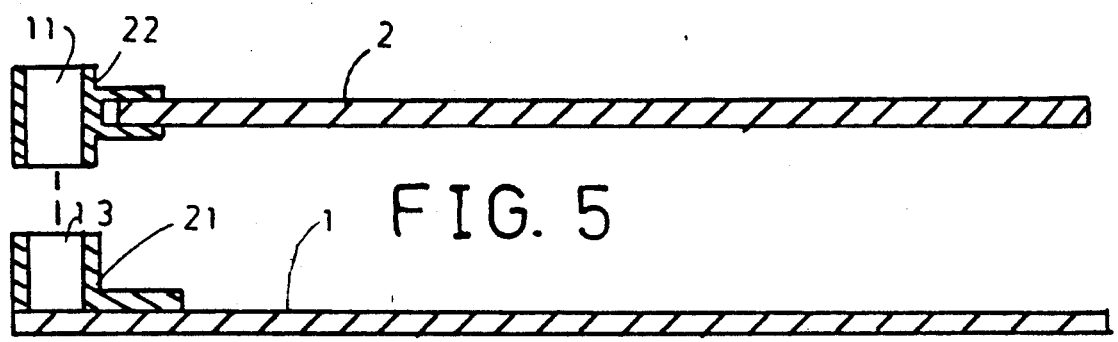
FIG. 5 is a vertical cross sectional view of an embodiment with attached connectors.

In the alternative embodiment shown in FIG. 5, a relatively thin base 1 and platform 2 have molded fittings 21 and 22 securely attached by attaching means well known in the art, and these shaped parts have the apertures 13 and 11 respectively for receiving the vertical members (not shown), while no apertures are made in base 1 and platform 2.

Figure 6:
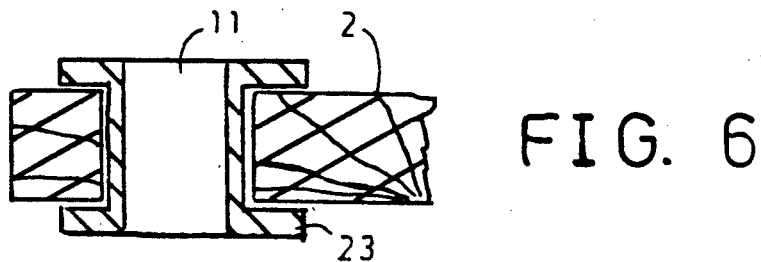
FIG. 6 is a vertical sectional detail view of a horizontal platform with a reinforcing insert.

The alternative embodiment illustrated in FIG. 6 shows how a horizontal platform 2 may be reinforced by a through hole reinforcing member 23 carrying the aperture 11 for the vertical member. Apertures in the base for receiving vertical members may also be reinforced by a through hole reinforcing member (not shown).

Figure 7:
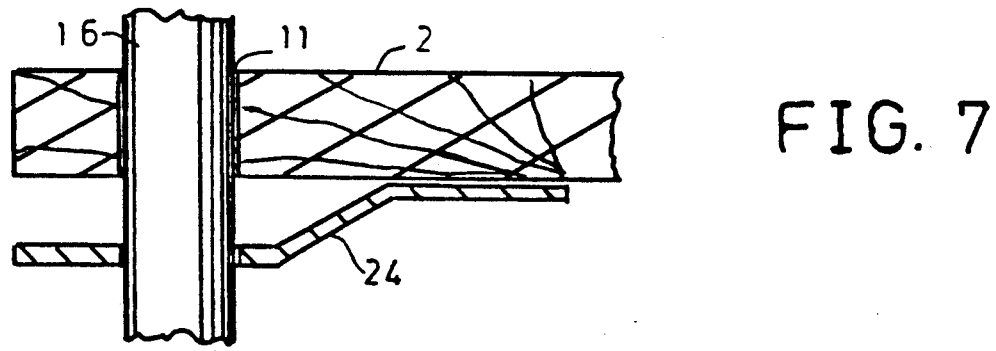
FIG. 7 is a vertical cross sectional detail view of a horizontal platform with a reinforcing strut.

In the alternative embodiment shown in FIG. 7, the platform is provided with a reinforcing strut 24. The base may also be provided with a reinforcing strut means.

When a television set is in use with a VCR, it may be useful to have an accessory shelf or shelves for accessories such as video cassettes, a cable converter, and the like. FIGS. 1 and 2 show the holder with an accessory shelf 5, partially broken away in FIG. 1, that also has a pair of closely fitting apertures 17 near its rear corners for engaging the vertical members 16. The accessory platform 5 has its two side edges folded over to form spacing legs 15 that, when resting upon the top of the VCR 4, elevate the accessory platform 5 far enough above the VCR, to provide ventilating air to dissipate heat generated by the VCR.

The drawings can also be used to illustrate the invention in use with a video monitor and computer accessory (such as a computer printer). To do so, simply replace the television set 3 by a video monitor, and replace the VCR 4 by a computer accessory.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A holder for holding an item above an instrument, said holder providing free vertical adjustment of a horizontal itemsupporting platform for accommodating instruments of different heights and employing gravity for fixing said vertical adjustment, said holder comprising:

a) a base means including a substantially flat horizontal forward portion arranged for resting upon a support surface and for receiving said instrument upon its upper surface, said base means further including a rear portion arranged for connecting to vertical member means;

b) two vertical member means connected to said rear portion of said base means at positions spaced apart sufficient to pass on either side of the protuberance at the rear of a video display instrument;

c) base connecting means securely connecting lower ends of said vertical member means to said rear portion of said base means;

d) a horizontal platform including a substantially flat forward part adapted for holding said item upon the upper surface thereof and vertical-member-engaging aperture means extending through said rear part, said aperture means having a shape corresponding to the cross section of said vertical member means and dimensions providing a close vertical sliding fit on said vertical member means when said platform is at a first angle to said vertical member means and said aperture means gripping said vertical member means when said platform is at another angle, with weight upon said forward part enhancing said gripping by gravitational force.

2. A support structure for holding an item above an instrument, said holder providing free vertical adjustment of a horizontal item-supporting platform for accommodating instruments of different heights and employing gravity for fixing said vertical adjustment, said holder comprising:
  a) a base means including a substantially flat, horizontal forward portion arranged for resting upon a support surface and for receiving said instrument upon its upper surface thereof;
  b) at least one vertical member means, including a lower end connecting to a rear portion of said base means, and said vertical member means extending upward from said base means;
  c) base connecting means securely connecting said lower end of said vertical member means to said rear portion of said base means;
  d) a horizontal platform including a substantially flat forward part adapted for holding said item upon the upper surface thereof and a rear part including vertical-member-engaging aperture means passing therethrough, said aperture means having a shape corresponding to the cross section of said vertical member means and dimensions providing a close vertical sliding fit on said vertical member means when said platform is at certain angles to said vertical member means and said aperture means gripping said vertical member means when said platform is at other angles, and weight upon said forward part enhancing said gripping by gravitational force;
  e) an accessory shelf means positioned above said horizontal platform, said shelf means having a substantially flat first, forward portion for holding accessories, a second, rear portion with vertical-member-engaging-aperture means for slidably engaging said vertical member means, and spacing feet means attached to said first, forward portion for elevating said shelf means above said item to provide ventilation to said item.

* * * * *